United States Patent [19]

Brown et al.

[11] Patent Number: 4,660,591

[45] Date of Patent: Apr. 28, 1987

[54] BALL VALVE AND SEAT ASSEMBLY

[75] Inventors: Cal R. Brown, Euclid; Michael T. Gallagher, Mayfield Heights; Richard F. Wozniak, Euclid; Peter C. Williams, Cleveland Heights, all of Ohio

[73] Assignee: Whitey Co., Highland Hts., Ohio

[21] Appl. No.: 876,513

[22] Filed: Jun. 26, 1986

[51] Int. Cl.$^4$ ............................................. F16K 23/00
[52] U.S. Cl. .................................... 137/312; 251/174; 251/214; 251/288; 251/317
[58] Field of Search ............... 137/312; 251/172, 174, 251/214, 315, 317, 288

[56] References Cited

U.S. PATENT DOCUMENTS

| | | | |
|---|---|---|---|
| 2,606,738 | 8/1952 | Glen | 251/315 |
| 3,132,836 | 5/1964 | Dickerson | 251/315 X |
| 3,184,213 | 5/1965 | Anderson | 251/172 |
| 3,195,560 | 7/1965 | Pofit | 251/172 X |
| 3,576,309 | 4/1971 | Zawacki | 251/317 X |
| 4,451,047 | 5/1984 | Herd | 251/214 X |
| 4,558,874 | 12/1985 | Williams | 251/214 X |

Primary Examiner—Harold W. Weakley
Attorney, Agent, or Firm—Fay, Sharpe, Fagan, Minnich & McKee

[57] ABSTRACT

A ball valve is disclosed having an improved seat ring particularly adapted for sealing a ball member in an end-loaded or top-loaded valve body. The ball is mounted for selective rotation and limited axial movement in a valve body passageway. The seat rings are disposed on diametrically opposite sides of the ball about valve inlet and outlet openings. Frusto-conical disc springs interposed between each seat ring and an associated valve body shoulder urge the seat rings into engagement with the ball. A rigid reinforcing ring is disposed intermediate of the flexible seat ring for integral movement with the seat ring and for reinforcing the seat ring against collapse under pressure. The reinforcing ring is received in an annular channel about the periphery of the seat ring and preferably comprises a split metal ring in a stressed and expanded condition.

21 Claims, 7 Drawing Figures

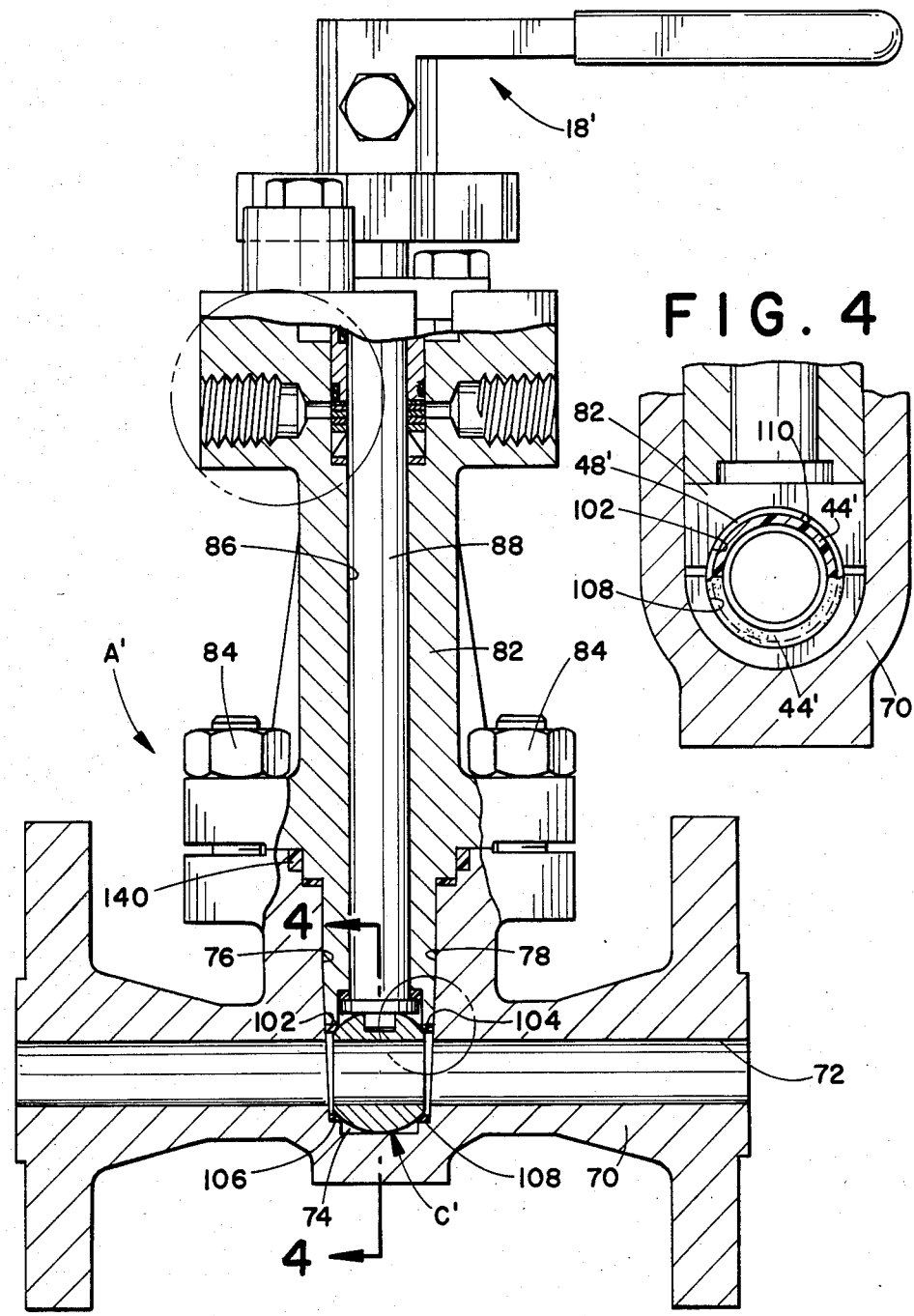

BALL VALVE AND SEAT ASSEMBLY

BACKGROUND OF THE INVENTION

This invention relates to the valve art, and more particularly, to ball valves. The invention is particularly applicable to a new and improved ball valve and seat assembly for a valve of the type having a so-called "floating ball" and, more particularly, to a valve wherein the floating ball is end-loaded or top-loaded, and will be described with particular reference thereto. However, it will become readily apparent to those skilled in the art that the invention is capable of broader applications and could be adapted for use in other types and styles of valves.

Ball valve constructions in commercial use typically employ annular seats or seat rings formed of resilient and/or deformable plastic for sealing engagement with the ball. A pair of such seat rings are positioned adjacent inlet and outlet openings. The ball itself is mounted for a slight amount of free movement or shifting axially of the seat when the ball is in a valve closed position under fluid pressure conditions. Such shifting causes the ball to act against and flex the downstream seat ring to enhance its sealing engagement with the ball. The amount of such flexing varies in accordance with the fluid pressure involved.

At conditions where the upstream seat seals against the ball member at a valve closed position, a problem occurs with a "blowing-in" bulge on the upstream seat at the first opening of the valve. As the valve is being opened, the upstream seat must momentarily span the opening or fluid passage extending through the ball and hold back fluid pressure. During this short period of time until the upstream seat seal is relieved by further opening of the valve, the portion of the seat spanning the fluid passage can deform into the passage under fluid pressure. With a small opening in the ball, the seat is quite rigid when loaded as a beam in bending and can easily bridge the gap. As the valve size and ball opening increase, the section modulus of the seat does not proportionately increase to retain the same stiffness. Thus, the seat may deflect and deform further into the ball opening to form a bulge in that sector of the seat ring.

As repetitive recycling occurs throughout the life of the valve, the bulge in the upstream seat becomes more pronounced and actually operates to cam a floating ball against the downstream seat as the ball member is rotated to the valve open position. The resulting camming action further stresses, even cutting, the downstream seat, and may ultimately distort and wear the seat into a non-operative condition. The bulge on the inlet seat cams the ball off center and holds it away from both seats while closed causing seat leakage in the closed position.

Where soft plastic seats are employed, such as those made of polytetrafluoroethylene, particular problems encountered with cold flow creep in the seat at non-contained portions aggravate wear and undesirable seat deformation. A sealing upstream seat which has a generally unsupported front face can creep in toward the center of the valve when the valve is closed and under a long duration static fluid pressure drop across the upstream seat. Untimately, as the seat creeps forward it can cave-in entirely, or before that point it typically curls into the orifice of the ball such that when the valve is operated the seat is torn. This problem becomes more pronounced as the valve size increases.

The downstream seat can also creep in toward the center of the valve by its generally unsupported annular front face. When the valve is in the closed position, the seat may be displaced upstream by the ball member pushing into it under pressure load.

Where large ball members are employed in larger sized valves, the ball member weight additionally contributes to deformation and cold flow problems. As the seats deform after a period of use the ball member may sag to the bottom of the valve, thereby providing a clearance at the top of the valve for a leak path.

To provide improved compensation for seat ring wear, distortion and creep, as well as seat tolerance and ball sag, while providing an elastic support which effects a low pressure force bias, metal frusto-conical disc springs have been disposed in operative engagement with the seat ring rear face. The disc spring provides seat elasticity not dependent on the plastic memory of the plastic material. In addition, it is known to provide a support ring opposite the disc spring to contain the plastic seat ring. The support ring operates to provide additional seat ring support for bridging the ball passage at valve opening to minimize the blowing-in bulge and the associated reflected distortion on the downstream seat. Additionally, the support ring confines the seat to minimize cold flow creep distortion. An essential element of a valve design including a support ring is a support shoulder or counterbore opposite of the valve shoulder which provides a bearing or support surface for the support ring and ultimately the seat ring. Without such a support surface, the support ring is free to move away from the seat ring and precludes proper seat ring support.

In single-side end-loaded or top-loaded ball valves, although support rings are desirable, the structure of the valve body itself has precluded the formation of such a support ring support shoulder. In a single-side end-loaded ball valve the inclusion of such an element would block loading of the ball. In a top-loaded ball valve such a design would block loading of a seat ring assembly.

One suggestion for an item to support the seat ring in place of a shoulder-supported support ring has comprised a rigid casing that encases a portion of the flexible seat ring, generally about its radially outermost wall, and which further includes a flange normally depending therefrom and disposed in operative engagement with the seat ring front face. The flange limits cold flow creep and inhibits blowing-in of the seat ring. However, a particular problem with such a construction is that the casing need be formed about the perimeter of the seat and, accordingly, requires consumption of seat assembly area which could more usefully comprise flexible seat material. Another disadvantage of a casing support is that it limits the flexibility of virtually the entire plastic seat, including hindering the seat from moving forward against the ball. Thus, while the casing may provide support against seat creep and blowing-in bulge, it may actually hold back a seat and spring combination from compensating for wear, tolerance and ball sag. As the valve is cycled and the seats are worn, the spring may have to overcome both the elasticity of the seat ring and the rigid support of the casing to effect seat to ball engagement.

It has, therefore, been desired to develop a ball valve and seat assembly for a floating ball type of valve applicable to top-loaded and single side end-loaded ball valves in both the small and large sizes.

The present invention contemplates a new and improved construction which overcomes all of the above referred to problems and disadvantages and provides a new and improved floating type ball valve and seat assembly which will facilitate operation and sealing of the valve.

SUMMARY OF THE INVENTION

Generally, the present invention contemplates a new and improved ball valve and seat assembly wherein a flexible seat ring with its own mechanical elasticity is cooperatively disposed with an associated disc spring and a reinforcing ring intermediately disposed of the seat ring, to sealingly engage a ball. The reinforcing ring is disposed intermediate the general cross-sectional area of the flexible seat ring so that the seat assembly may be employed in single-side end-loaded or top-loaded ball valve. The reinforcing ring substantially improves operation of the seat assembly by supporting the flexible seat against blowing-in or cold flow and without holding back the seat and spring combination from compensating for wear.

More specifically, the subject invention is particularly applicable to use in a ball valve of the type having a single-side end-loaded or top-loaded valve body with a central passageway, and a ball member positioned in the passageway including a fluid flow opening and mounted for selective rotation between valve open and closed positions to control fluid flow through the valve. A pair of radially inward extending shoulders in the passageway are disposed opposite of the ball member. A pair of composite seat member assemblies are positioned axially in the passageway oppositely disposed of the ball and supported against the ball by the shoulders for fluid sealing engagement with the ball. Each of the seat member assemblies comprise a seat ring, a disc spring and a reinforcing ring. The seat ring is adapted for elastic flexure generally toward and away from the ball member and includes a central opening aligned with the ball fluid flow opening. The disc spring has a central opening similarly aligned with the ball member, and a generally frusto-conical configura- tion in an unstressed condition. The disc spring is interposed between the seat ring and the body shoulder for continuously urging the seat ring toward engagement with the ball member. The reinforcing ring is inte- grally received in the seat ring to reinforce the seat ring against collapse under pressure.

In accordance with another aspect of the present invention, the seat ring includes an outer peripheral wall having an annular channel which receives the reinforcing ring. The reinforcing ring preferably comprises a metallic split ring in a stressed and expanded condition.

In accordance with another aspect of the present invention, the reinforcing ring is disposed in general radial alignment with a radially innermost portion of the seat ring for particularly reinforcing the radially innermost portion against blowing-in collapse.

The principal object of the invention is the provision of a new and improved ball valve and seat assembly which includes a seat reinforcing ring to improve the valve operation and cycle life.

Another object of the present invention is the provision of such a ball valve and seat assembly which can be conveniently assembled in an end-loaded or top-loaded ball valve.

Still another object of the present invention is the provision of a new and improved ball valve and seat assembly which permits the reinforcing ring to be disposed within the general cross-sectional area of the seat ring so that the reinforcing ring moves with the seat and avoids inhibiting the seat from moving forward against the ball during normal operational seat flexure.

Still other objects and advantages of the invention will become apparent to those skilled in the art upon a reading and understanding of the following specifications.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 3 is an elevational view, partially in cross-section, of a top-loaded ball valve which incorporates the subject invention;

FIG. 4 is a cross-sectional view taken along line 4—4 of FIG. 3 particularly illustrating the seat assembly and wherein the ball is deleted for ease of illustration and the seat assembly is shown in partial section;

DETAILED DESCRIPTION OF THE PREFERRED EMBODIMENT

Figures 1, 2:
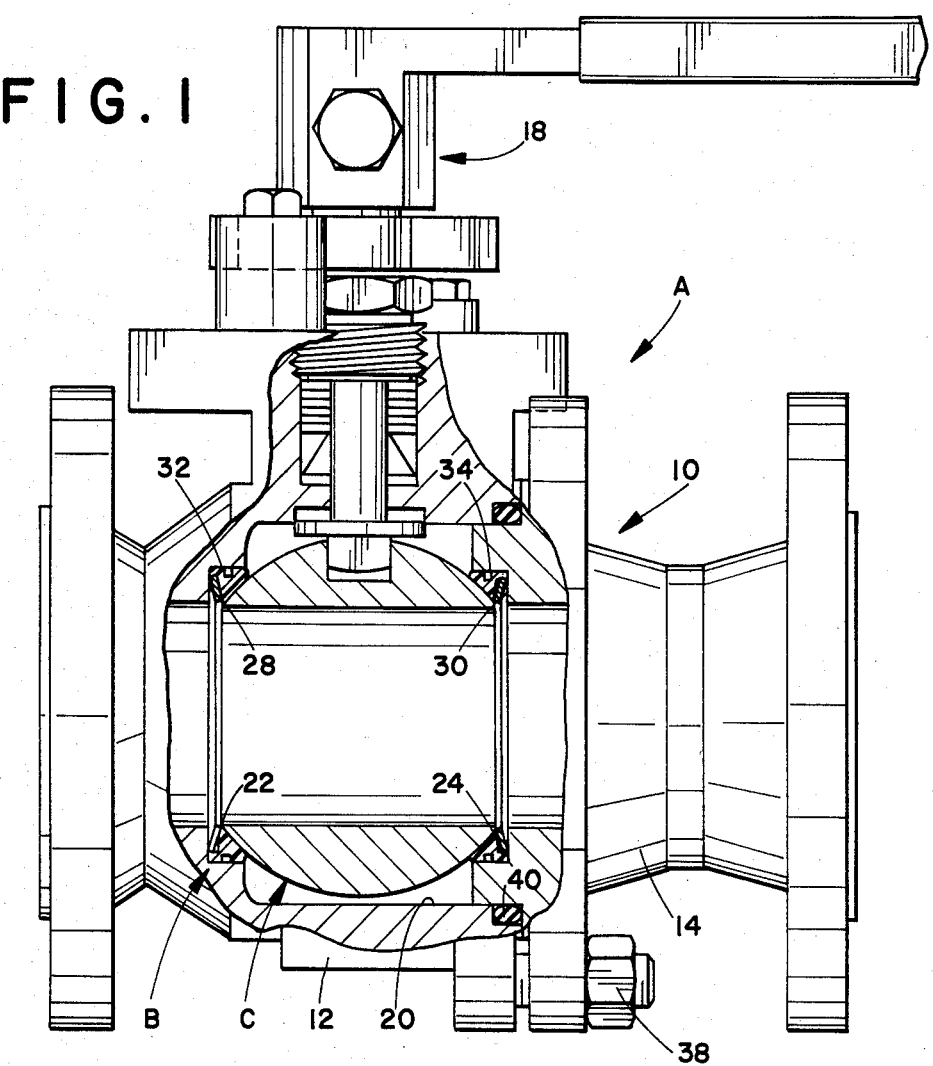
FIG. 1 is an elevational view, partially in cross-section, of a single-side end-loaded ball valve which incorporates the subject invention.
FIG. 2 is an enlarged cross-sectional view of the seat assembly of the valve of FIG. 1.

Referring now to the drawings where the showings are for purposes of illustrating the preferred embodiments of the invention only and not for purposes of limiting same, FIG. 1 shows a ball valve A having a pair of opposed seat assemblies B disposed on opposite sides of a floating-type spherical ball member C.

More particularly, and with reference to FIGS. 1 and 2, ball valve A comprises an end-loaded ball valve including a body or housing generally designated 10 having a main or central body section 12 and an end fitting 14. End-loaded ball valves are particularly useful for larger size ball valve applications. Seat assemblies B and ball member C are mounted within the body 10 and arranged for selective rotation by a stem and actuating handle assembly generally designated 18.

The details of all portions of the valve illustrated in FIGS. 1 and 2, except for the ball and seat ring assemblies, may be modified as desired and/or necessary to accommodate different types of styles of ball valve constructions. For purposes of describing the subject invention, however, the details of the actuating handle assembly 18 are more specifically discussed in commonly assigned and co-pending application Ser. No. 873,005 filing date June 16, 1986 entitled CONSTANT DISPLACEMENT DUAL POSITION CAM STOP ASSEMBLY.

The ball seat arrangement utilized in the subject invention includes a pair of seat ring assemblies B disposed on opposite sides of ball member C. As shown, the seat ring assemblies are retained in a position on opposite sides of the ball adjacent opposite ends of the main body section passageway or opening 20. In the preferred embodiment here under discussion, the seat ring assemblies are located substantially equidistantly from and on diametrically opposite sides of the axis of rotation of the ball and include radially innermost central openings 22,24. The seat ring assemblies are generally annular in configuration and could be maintained in position by many different or alternative arrangements; however, they are shown in the preferred embodiment as being located by a first radially inward extending shoulder 28 in main body section 12 and a second shoulder 30 in the end fitting 14. Flanges 32, 34, normally depending from the shoulders 28, 30, respectively, define a peripheral support or bearing surface in combination with the shoulders to limit radial and axial movement of the seat assemblies B.

It may be seen that assembly of the ball valve A is accomplished by assembly of a first seat assembly against shoulder 28 and flange 32, insertion of the ball C into the main passageway 20 and fastening of the end fitting 15 to the mail body section 12. The end fitting includes the second seat assembly mounted adjacent second shoulder and flange 30, 34. Fastening of the end fitting 14 to the main body section 12 is accomplished with conventional fasteneters 38. A sealing ring 40 seals the end fitting 14 to the main body section 12.

With particular reference to FIG. 2, description will be made of the specific details of each seat assembly B. The seat assemblies are each preferably comprised of three components, i.e., an elastic of flexible seat ring such as plastic seat 44, a frusto-conical disc spring 46, and a reinforcing or support ring 48.

Seat ring 44 preferably comprises a plastic seat, typically constructed of polytetrafluoroethylene and adapted for elastic flexure generally toward and away from the ball and includes a central opening 22. Seat 44 is disposed for fluid sealing engagement with the ball at a ball engaging surface 50 contoured for fluid sealing engagement with the ball C as is more particularly described in U.S. Pat. No. 4,410,165. A seat shoulder facing surface 52 is inclined or tapered away from shoulder 28 at an unstressed and unflexed condition. Flange or lip 54 extends axially outward of shoulder facing surface 52 at shoulder flange 32. This lip is preferably continuous about the seat ring 44 and located so that its radial inner surface generally corresponds to the outside diameter of the disc spring 46. The lip is beveled at its radial outermost area and slightly rolled over the radial outer edges of the disc spring 46 in the manner shown. While not necessary, this arrangement advantageously maintains the seat ring and disc spring together as a subassembly. Seat 44 also includes an outer annular peripheral wall or surface 58 having an annular channel 60. The reinforcing ring 48 is received in the channel to reinforce the plastic seat 44 against collapse under pressure. The shoulder flange 32 is sized for generally coextensive engaging support of the seat 44 at seat outer peripheral wall 58. Although illustrated as a rectangular cut groove, channel 60 may comprise a variety of configurations, just as reinforcing ring 48 can comprise a split metal ring having a circular cross-sectional configuration or a generally square cross-sectional configuration. A purpose of the ring 48 is to reinforce the radially innermost portion of the ring 44 generally adjacent the opening 22 of the seat and keep that portion from blowing-in during valve cycling. Although it is desirable to position the ring 48 as far as possible from the ball engaging surface 50 to allow for the most wear of the seat 44 during operation, the ring 48 is generally intermediately disposed in the ring 44 in radial alignment with the radially innermost portion of the seat ring 44 for particular reinforcement of that portion. Accordingly, the ring 48 is substantially centered between the tapered shoulder-facing surface 52 and the contoured ball engaging surface 50. Positioning of the ring 48 generally within the cross-sectional area of the seat 44, such as in an annular groove 60, allows it to move with the seat during normal valve operation or when the seat assembly B must flex toward and away from the ball member C. This avoids the problems of prior known casing supports which hinder such desirable seat assembly flexure. Another advantage of the subject invention is that the seat assembly B minimizes the amount of plastic material needed in the assembly by minimizing the seat size. This allows for a better and more closely controlled valve seal.

The reinforcing ring 48 is slightly expanded and stressed as it is received in the channel 60. This applies a radially inward preload to provide better reinforcement for the plastic seat 44. Accordingly, the ring 48 includes an annular discontinuous portion at the split; however, the discontinuous portion is sized for negligible reinforcement loss to the seat ring adjacent that portion. Although preferably constructed of metal, it is within the scope of the invention to include alternate rigid reinforcing materials for construction of the ring 48.

Frusto-conical disc spring 46 includes a diameter at its outer end such that the disc spring may be received within the cylindrical cavity defined by the inner wall of the plastic seat axial flange 54 and shoulder facing surface 52. The inner diameter of the disc spring is substantially equal to the diameter of the opening 22 through the plastic seat 44.

The disc spring 46 is selected so that its force is sufficient under partial deflection to continuously urge the seat 44 toward the ball C. The spring must also allow stressing or compression thereof toward a flattened condition to accommodate ball shifting and engagement with the ball engaging surface 50. In the preferred embodiment here under discussion, the seat ring shoulder facing surface 52 is configured so to substantially stress disc spring 46 at valve make-up, i.e., move the disc spring from a frusto-conical shape toward a substantially flattened configuration.

With particular reference to FIGS. 3 through 7, an alternative embodiment of the subject invention is illustrated comprising a top-loaded, full port ball valve A'. For ease of illustration, like elements to the ball valve of FIG. 1 are identified by like numerals with a primed (') suffix and new elements are identified by new numerals. Valve A' includes a main body section 70 including a fluid flow passageway 72 and a ball chamber 74 disposed intermediate the passageway 72 and defined by an opposed pair of generally planar body shoulders 76, 78. The lower sections of shoulders 76, 78 are inclined toward one another such that the ball chamber 74 is slightly wedge-shaped as shown.

The ball C' is received in the ball chamber 74 and includes a fluid flow opening wherein the ball may be selectively rotated between valve open and closed positions to control fluid flow through the valve. A bonnet 82 is fastened to the body 70 with fasteners 84 and includes a stem bore 86 sized for close reception of a stem 88 positioned in the bore. The stem 88 includes an outwardly extending shoulder or flange 90 (FIG. 5) formed at the base of the stem 88 to engage a stem bearing 92. Bearing 92 is interposed between the flange 90 and a radially inwardly extending flange or shoulder 94 formed within stem bore 86 to provide a blow-out proof stem assembly. The lower end 96 of the stem is configured as shown for sliding receipt in a slot or groove 98 included in the upper end of the ball. This arrangement allows the ball to be rotated between valve open and closed positions while at the same time permitting the ball to have some freedom of movement for shifting axially in valve body ball chamber 74 when the valve is in a closed position and fluid pressure is acting on the ball. Ball valve A' comprises a top-loaded ball valve for easy in-line maintenance and provides an extended bonnet that offers substantial insulation allowance and clearance. The valve handle assembly 18' is operatively secured to the stem 88 for the selective rotation of the ball by operation of the handle.

The seat member assemblies B' are generally annular in configuration and are positioned oppositely of the ball in the ball chamber 74 for fluid sealing engagement between the ball and the body shoulder 76, 78. Each seat ring (FIGS. 4 and 5) includes a flexible seat ring 44' including a central opening 22' for general alignment with the ball fluid flow opening, a ball engaging surface 50' for sealing engagement to the ball, and an annular groove or channel 60' disposed in a radially outermost peripheral portion of the ring. A reinforcing ring 48' is received in the channel 60' for applying a radially inwardly directed preload force to the seat ring 44' and reinforcing the ring against collapse under pressure. A disc spring 46' is interposed between the seat shoulder facing surface 52' and the shoulder 78.

As is apparent, the ball C' and the seat member assemblies B' are loaded into the ball chamber 74 from the upper end of chamber 74. The tapered or wedge-shaped nature of the lower end of chamber 74, in combination with disc springs 46', causes the seat member assemblies B' to be driven axially toward the opposite sides of ball C' to generate sufficient pressure to provide suitable sealing engagement between the seat rings 44' and the surface of ball C'. By proper selection of the dimensions of the various components, the sealing pressure for low pressure fluid sealing can be controlled.

The bonnet 82 includes a pair of seat member assembly support walls 102, 104 (FIG. 3) each having an arcuate configuration for generally mating peripheral support to the assemblies B. As may be particularly seen in FIG. 4, the peripheral support by the bonnet support walls extends essentially 180° about the top portion of each seat assembly. The ball chamber 74 additionally includes a pair of seat member assembly support surfaces 106, 108 each having an arcuate configuration for generally mating peripheral support to the assemblies about the other 180° of the seat assembly. The ball chamber support surfaces 106, 108 are thus disposed opposite of the bonnet support walls 102, 104 to provide a generally annular peripheral support to the seat assemblies. It may be particularly noted in FIG. 4 that the split ring 48' includes a discontinuous portion 110 to allow the ring to retain its tension support of the seat 44'.

Figure 7:
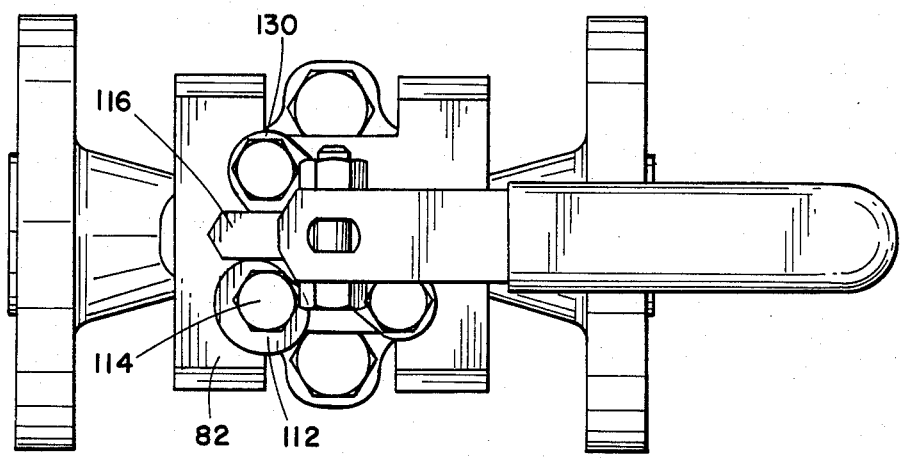

With particular reference to FIG. 7, a cardioid-like configured cam stop 112 is fastened to the bonnet 82 with cam stop bolt 114, alternately, the cam stop can be fastened with alternate means such as a weld. The handle includes a flat faced cam follower stop and direction indicator 116 disposed for abutment against the cam stop for limiting rotational movement of the valve handle, and consequently the ball in the valve passageway 20, by setting first and second handle stop limits defined by engagement of the indicator 116 to the cam stop 112. The cam stop is selectively positionable relative to the bonnet 82 for preselection of the handle stop limits. Such a handle and stop cam assembly provides maximum flow in the fully open position and maximum seat coverage and leak-tight shut off in the closed position due to the selective adjustment of the stop limits.

Figure 6:
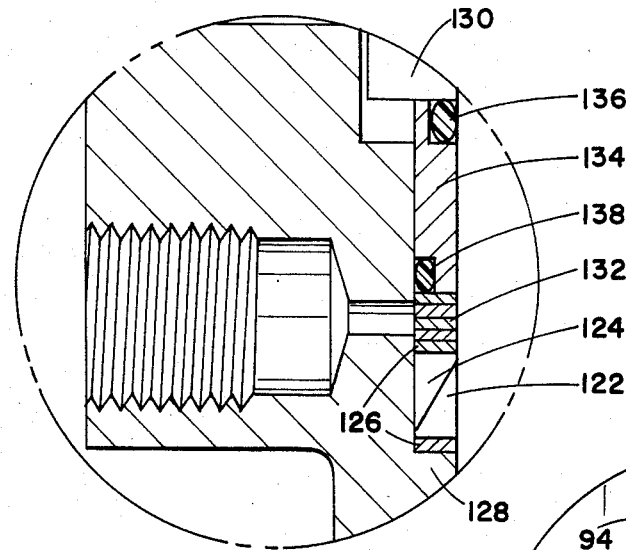
FIG. 6 is an enlarged cross-sectional view of the stem seal and purge port of the valve of FIG. 3; and, FIG. 7 is a plan view of the ball valve of FIG. 3.
Figure 5:
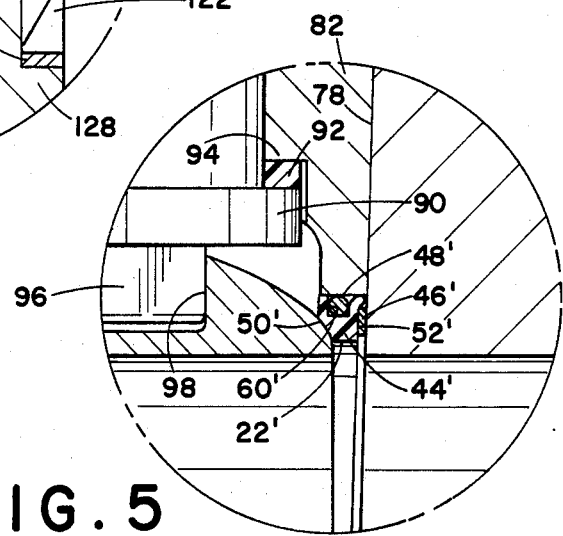
FIG. 5 is an enlarged cross-sectional view of the seat assembly of the valve of FIG. 3.

With particular reference to FIGS. 3 and 6, the stem packing comprises a two-piece packing including a lower primary stem packing 122 and an upper primary stem packing 124. Primary stem seal glands 126 sandwich the packings 122, 124. The primary packing and gland assembly is supported on a radially inwardly extending bonnet shoulder 128 which serves as a support base for compression of the packing by a packing yoke 130.

Adjacent the uppermost primary stem seal gland is disposed a number of packing springs 132 which are compressed or biased by a secondary seal gland 134 and inner and outer secondary seals 136, 138 respectively. The yoke 130 and springs 132 comprise a force applying means which cooperate with the stem 88 for axially compressing the primary packing and expanding the packing radially into sealing engagement with the stem bore 86 and stem 88.

A stem packing purge/sniffer port 142 is disposed in the bonnet 82 adjacent the secondary stem seals to allow detection of packing leakage, purge of packing leakage, and pressurizing above the primary packing to reverse the pressure differential across the primary stem packing.

The bonnet 82 is further sealed to the main body section 70 by a bonnet seal 140 (FIG. 3).

The invention has been described with reference to preferred embodiments. Obviously, modifications and alterations will occur to others upon a reading and understanding of the specification. It is our intention to include all such modifications and alterations insofar as they come within the scope of the appended claims or the equivalents thereof.

Having thus described the invention, we now claim:

1. A ball valve comprising:
   a body having a central passageway;
   a ball member including a fluid flow opening therethrough, said ball member being positioned in said passageway and mounted for selective rotation between valve open and closed positions to control fluid flow through said valve;
   a pair of radially inward extending shoulders in said passageway oppositely disposed of said ball member; and,
   a pair of composite seat member assemblies positioned axially in said passageway oppositely disposed of said ball member for fluid sealing engagement with said ball member, each of said pair comprising:
   a seat ring adapted for elastic flexure generally toward and away from said ball member and including a central opening, a shoulder facing surface generally facing an associated one of said shoulders, a ball engaging surface contoured for fluid sealing engagement with said ball member, and an outer peripheral wall having an annular channel;

a disc spring having a central opening and a generally frusto-conical configuration in an unstressed condition interposed between said seat ring and said associated one of said shoulders for continuously urging said ball engaging surface toward engagement with said ball member; and, a reinforcing ring means received in said annular channel whereby said reinforcing ring reinforces the seat ring against collapse under pressure.

2. The ball valve as defined in claim 1 wherein said reinforcing ring means applies a radially inwardly directed preload force to said seat ring.

3. The valve as defined in claim 1 wherein a body peripheral wall depends from said asociated one of said shoulders, said body peripheral wall being sized for engaging support of said seat ring at said seat ring outer peripheral wall.

4. The valve as defined in claim 3 wherein said annular channel is open against said body peripheral wall, said reinforcing ring being spaced from said body peripheral wall.

5. The valve as defined in claim 1 wherein said reinforcing ring means comprises a split metal ring.

6. The valve as defined in claim 5 wherein said split metal ring has a circular cross-sectional configuration.

7. The valve as defined in claim 5 wherein said split ring is stressed in an expanded condition.

8. The valve as defined in claim 7 wherein said split ring includes an annularly discontinuous portion, said discontinuous portion being sized for negligible reinforcement loss at said seat ring adjacent said discontinuous portion.

9. A top-loaded full port ball valve comprising:

a body having a central passageway, and a ball chamber disposed intermediate said passageway and defined by a pair of body shoulders extending generally transverse of said passageway;

a ball with a fluid flow opening received in said body passageway for selective rotation between valve open and closed positions to control fluid flow through the valve;

a bonnet fastened to the body and having a stem bore and a stem positioned in said bore, said stem being associated with said ball;

a valve handle operatively secured to said stem and said ball for the selective rotation of said ball by operation of said handle;

a pair of seat member assemblies positioned oppositely of said ball in said ball chamber for fluid sealing engagement between said ball member and said body shoulder, each of said pair comprising:

a flexible seat ring including a central opening for general alignment with the ball fluid flow opening, a ball-engaging surface for sealing engagement to the ball and an annular groove disposed in a peripheral portion of the ring; and, a reinforcing ring received in said groove for reinforcing the seat ring against collapse under pressure.

10. The valve as claimed in claim 9 wherein said each of said pair of seat member assemblies is generally annular in configuration and wherein said bonnet includes a pair of seat member assembly support walls each having an arcuate configuration for generally mating peripheral support to the assemblies.

11. The valve as claimed in claim 10 wherein said ball chamber includes a pair of seat member assembly support surfaces each having an arcuate configuration for generally mating peripheral support to the assemblies, said support surfaces being disposed opposite of said support walls to provide a generally annular support to the seat assemblies.

12. The valve as claimed in claim 9 wherein said each of said seat member assemblies further includes a disc spring interposed between said seat ring and one of said valve body shoulders.

13. The valve as claimed in 9 wherein a cardioid-like configured cam stop is fastened to said bonnet and said handle includes a handle stop and direction indicator disposed for abutment against said cam stop for limiting rotational movement of said valve handle, and consequently, said ball member in said valve passageway;

said cam stop being selectively positionable relative to said bonnet for preselection of said handle stop limits.

14. The valve as claimed in claim 9 including:

a valve stem packing arrangement comprising a primary stem seal including a two-piece primary packing, force applying means cooperating with said stem for axially compressing said packing and expanding said packing radially into sealing engagement with said stem bore and said stem, said force applying means spaced intermediate of said primary and secondary seals; and, a purge port generally opposite said packing arrangement.

15. A single-side end-loaded ball valve comprising:

a body and a body end each having a central opening defining a valve fluid flow passageway, and a ball chamber disposed intermediate said passageway and defined by a body shoulder and a body end shoulder extending generally transverse of said passageway;

a ball with a fluid flow opening received in said body passageway for selective rotation between valve open and closed positions to control fluid flow through the valve, and, a pair of seat member assemblies positioned oppositely of said ball in said ball chamber for fluid sealing fluid sealing engagement said ball member and said body shoulders, each of said pair comprising:

a flexible seat ring including a central opening for general alignment with the ball fluid flow opening, a ball engaging surface for sealing engagement to the ball and a reinforcing ring means received in a peripheral portion of the ring for reinforcing the seat ring against collapse under pressure.

16. The ball valve as defined in claim 15 wherein said reinforcing ring means applies a radially inwardly directed preload force to said seat ring.

17. The valve as defined in claim 15 wherein said body shoulder and said body end shoulder have a generally annular configuration and each include a depending flange entending toward said ball, said flanges and shoulders providing a bearing surface support for the seat member assemblies.

18. The valve as defined in claim 17 wherein said each of said seat rings include an annular groove in said peripheral portion, open-ended toward said shoulder depending flange, said reinforcing ring means being received in said groove and applying a radially inwardly directed preload force to said seat rings.

19. A ball valve comprising:
a body having a fluid flow passageway and a ball chamber disposed intermediate said passageway, said chamber being defined by a pair of opposed seat ring bearing surfaces;
a ball with a fluid flow opening received in said body passageway for selective rotation between valve open and closed positions to control fluid flow through the valve; and,
a pair of seat member assemblies positioned in said ball chamber for fluid sealing engagement between said ball member and said bearing surfaces, each of said pair comprising:
a flexible seat ring including a central opening for general alignment with the ball fluid flow opening and adapted for elastic flexure generally toward and away from the ball,
a disc spring having a central opening and a generally frusto-conical configuration in an unstressed condition interposed between said seat ring and an associated one of said bearing surfaces for continuously urging said seat ring toward engagement with the ball; and,
a rigid reinforcing ring intermediately disposed in said seat ring in general radial alignment with a radially innermost portion of said seat ring to reinforce the seat ring against collapse under pressure.

20. The ball valve as defined in claim 19 wherein said associated one of said bearing surfaces comprises an annular support shoulder and an annular flange depending therefrom, said shoulder and flange being disposed to provide a peripheral support for said seat ring assembly.

21. The ball valve as defined in claim 20 wherein said reinforcing ring is disposed for movement with said seat ring as the seat elastically flexes during valve operation.

* * * * *